INVENTOR
German Arana Ormazabal

INVENTOR
German Arana Ormazabal

BY *Imirie and Smiley*

ATTORNEY

United States Patent Office 3,188,548
Patented June 8, 1965

3,188,548
SYSTEM FOR PROTECTION OF SILICON, SELENIUM AND GERMANIUM RECTIFIERS
German Arana Ormazabal, 1 Campanario St., San Sebastian, Spain
Filed Feb. 10, 1961, Ser. No. 88,509
5 Claims. (Cl. 321—14)

This invention relates to a method, system and apparatus for protecting rectifiers of the semiconductor type formed from silicon, germanium and similar materials.

The recent discovery of semiconductor materials and their application to the rectification of currents in industrial applications has met with a serious disadvantage in the fragility that such semiconductors evidence against overcurrents arising from peak surges, and particularly short circuits, in the load circuits to which the rectified current is applied.

The relatively high potentials under which the semiconductor rectifiers operate, their low internal resistances and small volumes make it relatively easy to burn out the rectifier when a short circuit takes place in the load circuit. In fact, the relatively high potential and the low internal resistance of the rectilinear cause the shortening current to reach a very high value in a very short period of time, while the small size of the rectifying device prevents the device from absorbing a great deal of heat before it is destroyed. Therefore, the rectifier circuit must be opened in a very short time if destruction of the rectifying elements is to be prevented. For example, the destruction of a silicon type semiconductor rectifier element takes place with a current ten times its normal value in about five milliseconds.

Accordingly, it is deduced that the overload protecting devices employed for protecting such rectifiers should be much quicker to operate than those normally employed in protecting electrical machines and other installations. The use of fuses, overload relays, or electromagnetic circuit breakers normally employed for the usual electrical installations is impossible. Instead it is necessary to use special, very quick acting protective devices, especially when it is intended to protect the rectifier elements from surge currents produced by high peak voltages of short length and particularly those produced in many circuits during moments of connection. The difficulty is still greater when the load circuit includes impedances or counterelectromotive forces as in the case when the rectified current is fed to D.C. motors. The use of quick acting protective devices means a much higher cost must be expended than that of the rectifying elements to be protected, and further they introduce into the installation sensitive elements which may be the source of future damage.

According to the invention, with rectifier circuits for D.C. motors and like applications having conventional type, slow acting safety and protecting devices, it has been found possible to introduce into the load circuit a battery of plates of semiconductors preferably formed from selenium, treated and arranged with their polarity such as to permit the passage of the current through the semiconductors in the direction of the rectified current in the load circuit. The battery of semiconductor selenium plates is made of appropriate dimensions for permitting the passage of the rectified current without overheating. The number of selenium semiconductor plates to be used may vary depending upon the type of rectifier circuit, and the characteristics of the electromagnetic circuit breakers, fuses or other types of safety devices employed.

Accordingly, it is a primary object of the present invention to provide a method and means for protecting rectifiers by incorporating a battery of semiconductors in series in the rectifier load circuit and so arranged as to permit passage of the rectified current, the characteristics of said battery being such as to provide greatly increasing resistance to the flow of higher load currents. The battery of semiconductors will thus act as a variable resistance, increasing with higher overload currents and tending to reduce such currents so that the rectifier is not harmed, permitting a slow acting safety device to operate before injury occurs to the rectifier.

It is a further object of the invention to provide in a rectifier, including a conventional slow acting safety device, a stack of semiconductor plates whereby to protect the primary rectifier during the relatively lengthy period necessary for the safety device to operate at a lower cost than would be possible by the provision of quicker acting safety devices.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
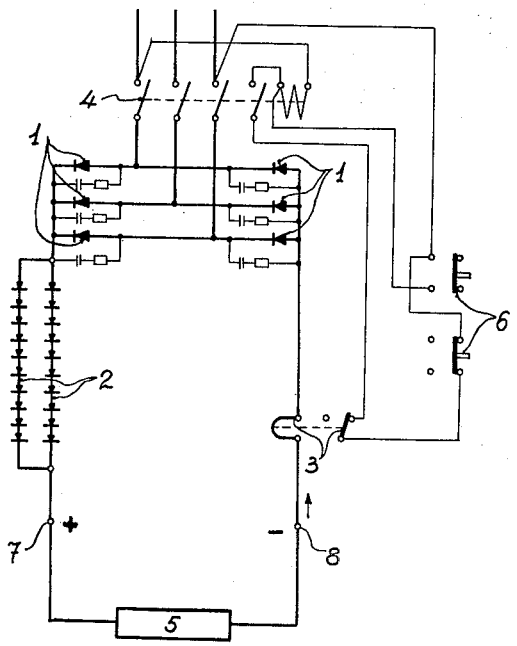
FIG. 1 is a schematic circuit diagram illustrating an embodiment of the invention as applied to a three phase bridge type rectifier.
Figure 3:
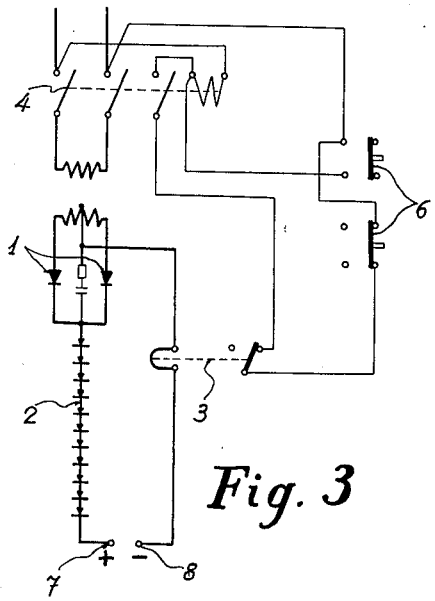
FIG. 3 is a circuit diagram illustrating one form of the invention as applied to a full wave single phase rectifier circuit.
Figure 2:
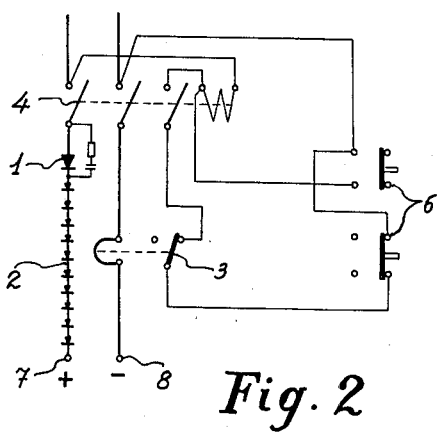
FIG. 2 is a schematic circuit diagram showing a modified embodiment of the invention as applied to a single phase rectifier load circuit.
Figure 4:
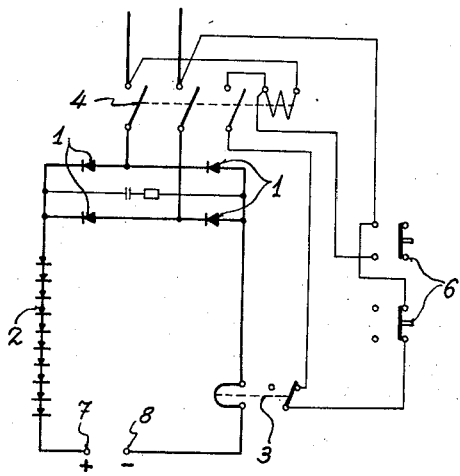
FIG. 4 is a circuit diagram illustrating an application of the invention to a single phase bridge rectifying circuit.
Figure 5:
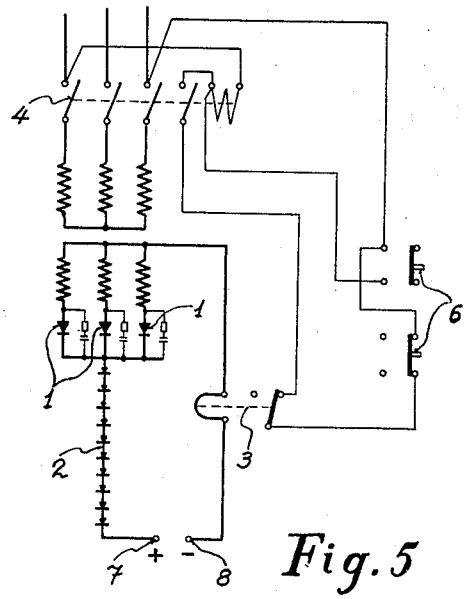
Figure 6:
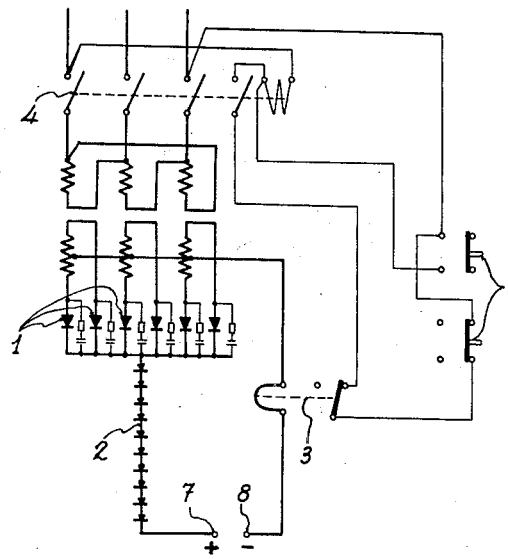

FIG. 5 is a circuit diagram illustrating the invention as applied to a three phase rectifier; and FIG. 6 is a circuit diagram illustrating the invention as applied to still another three phase rectifier circuit, Referring now to the drawings and more particularly to FIG. 1, there is shown as an example an application of the invention in a three phase bridge rectifier wherein the rectifier elements 1, preferably formed of silicon, germanium or selenium semiconductors, are connected in a three phase bridge connection. The rectified current is applied to the load 5 in series with the relay coil of a conventional safety device 3 connected to operate the electromagnetic circuit breaker 4 and open the power circuit upon overload in the load circuit. Part 6 designates control switches for the safety device. A plurality of semiconductor plates 2 are connected in two parallel branches and in series with the load. The semiconductor plates are preferably formed of selenium type semiconductors having barrier layers, and may be formed in somewhat the same manner as selenium rectifier plates, as will be later described.

In the described circuit, when short circuiting connections are applied between point 7 and 8, even repeatedly, there are produced overload currents which surge through the plates 2 and the protective device 3 without any harm to the rectifiers 1. In other words, the short circuit currents are so reduced by the battery of selenium semiconductors as to prevent injury to the silicon, selenium or selenium rectifiers before the overload device comprising relay 3 and circuit breaker 4 operate to open the circuit to the power source.

The selenium semiconductor plates 2 do not operate as rectifiers since the current passing through them is in the direction in which these plates are oriented for passage of current and the current has already been rectified by the elements 1. The advantage of the selenium semiconductor plates is that they exhibit the characteristic of increased resistance to higher currents along a curve taking a parabolic form, so that as higher and higher overload currents are encountered greatly increased resistance is provided by the battery of selenium semiconductors 2, thus tending to reduce the overload current which reaches the rectifier elements 1. Stated in another way, the battery of plates 2 exhibit a nonproportional, increased drop in potential with passage of higher currents so that proportionately more of the rectified potential is applied to the plates 2 during overload and proportionately less to the rectifier elements 1 in the load circuit.

Returning now to the matter of designing a protective circuit for a rectifier, the number of selenium semiconductor plates 2 necessary to form the protective battery is chosen as a function of voltage. This number depends on the type of plate to be used. With plates fabricated in accordance with the description above and which can support 40 volts each, the necessary number may be calculated on the basis of one plate for each 40 volts or fraction of rectified voltage. A rectifier of 400 volts output requires 10 plates mounted in series.

The selenium semiconductor plates fabricated as described above will carry 1 amp. for each area of 9–13 cm.$^2$. Based upon this value and as a function of the nominal rectified current, the total surface of the plates may be chosen. When the surface required is too large it will be necessary to place a number of the batteries of plates in parallel. As an example, a battery of plates for use with 400 volts rectified and 300 amp. rectified current will have six stacks of ten plates, the stacks being connected in parallel and each plate being approximately 150 millimeter by 300 millimeters.

For the rectifier shown in FIG. 1 designed to operate from 220 volts three phase with 290 volts rectified potential and 75 amp. rectified current, two stacks of ten plates as described above are adequate, the plates in each stack being in series and the stacks being connected in parallel. Each of the rectifiers 1 would be formed to permit a 600 volt peak inverse voltage and to have a capacity of 25 amp. of mean rectified current, half wave. The overload relay 3 should be adapted to carry 300 amp. nominally.

It should be clear from the above that the battery of selenium semiconductor plates is designed with different dimensions and number of plates for protective purpose in a load circuit then when designed for rectifying purpose even though in both instances operation is intended with the same voltage and current.

FIGS. 2–6 of the drawings are representative of other rectifier circuits, differing from FIG. 1, in which the selenium semiconductor elements 2 may be placed in the load circuit to protect the rectifier during the time necessary for the overload device 3 to operate. In these figures the same elements are designated by the same reference numerals.

It should be noted that the battery of selenium semiconductor plates may be applied to any existing type of rectifying circuit whether formed of silicon, germanium, selenium or other rectifiers and however connected. It is further desired to emphasize that the protection rendered possible against short circuits by means of the battery of selenium semiconductor plates is afforded with all types of safety devices normally used and is not limited to electromagnetic circuit breakers and relays. For example, fuses or other thermal devices for protection of the different branches of the rectifying circuits may be employed with the selenium semiconductor plates connected as illustrated in the various figures. Furthermore, the invention is not limited to the use of selenium semiconductors as the protective plates inasmuch as any semiconductor material evidencing the same property of nonproportional increase of resistance with higher currents may be used.

Although certain specific embodiments of the invention have been shown and described, it is obvious that many modifications thereof are possible. The invention, therefore, is not to be restricted except insofar as is necessitated by the prior art and by the spirit of the appended claims.

What I claim is:

1. In a rectifier system of the type including a source of alternating current, a pair of load terminals for connection to a given load, a rectifier circuit having direct current output terminals and semiconductor rectifier means adequate for said given load connected between said source and said output terminals, and direct current lines connecting said rectifier circuit output terminals to said load terminals, the improvements comprising a battery of semiconductors connected in one of said direct current lines to pass current in the rectified direction, said battery of semiconductors having an increasing electrical resistance to flow of increased current whereby to protect said rectifier means from the full effects of peak surges and short circuits in a load when connected to said load terminals.

2. The combination according to claim 1 in which said battery of semiconductors comprises a plurality of semiconductor plates formed of selenium treated to provide semiconductor barrier layers.

3. The combination according to claim 1 in which said battery of semiconductors comprises a plurality of selenium semiconductor plates connected in series with each other.

4. The combination according to claim 1 in which said battery of semiconductors comprises a plurality of selenium semiconductor plates connected in series parallel.

5. A rectifier system comprising a power circuit having a source of alternating current, a pair of load terminals for connection to a given load, a load circuit, a rectifier circuit having direct current output terminals and semiconductor rectifier means adequate for said given load connected between said source and said output terminals, direct current lines connecting said rectifier circuit output terminals to said load terminals, a relatively slow acting overload device connected in the load circuit in such way as to open at least one of said power and load circuits upon increase of the load circuit current beyond a predetermined value, and a battery of semiconductors connected in one of said direct current lines to pass current in the rectified direction, said battery of semiconductors having an increasing electrical resistance to flow of increased currents in the load circuit whereby the reduce the peak surge and short circuit currents arising in the load circuit and enable said overload device to operate before said rectifier means is injured.

References Cited by the Examiner

UNITED STATES PATENTS

| | | | |
|---|---|---|---|
| 2,444,458 | 7/48 | Master | 321—8 |
| 2,611,118 | 9/52 | Havlick | 321—16 |
| 2,969,495 | 1/61 | Mosch et al. | 321—14 |

LLOYD McCOLLUM, *Primary Examiner.*

SAMUEL BERNSTEIN, *Examiner.*